United States Patent
Graham et al.

[19]

[11] Patent Number: 6,068,796
[45] Date of Patent: May 30, 2000

[54] SUB-MINIATURE OPTICAL FIBER CABLES, AND APPARATUSES AND METHODS FOR MAKING THE SUB-MINIATURE OPTICAL FIBER CABLES

[75] Inventors: Lionell Graham, Norcross; James Robert Holman; Terry Don Mathis, both of Lilburn; Montri Viriyayuthakorn, Norcross, all of Ga.

[73] Assignee: Lucent Technologies Inc., Murray Hill, N.J.

[21] Appl. No.: 09/208,708

[22] Filed: Dec. 10, 1998

Related U.S. Application Data

[62] Division of application No. 08/510,021, Aug. 1, 1995.
[51] Int. Cl.$^7$ ..................................................... B29D 11/00
[52] U.S. Cl. .................. 264/1.28; 264/1.29; 264/171.13; 425/113; 425/114; 425/133.1
[58] Field of Search ................................. 264/1.28, 1.29, 264/1.1, 171.13; 425/133.1, 113, 114; 385/102

[56] References Cited

U.S. PATENT DOCUMENTS

| | | |
|---|---|---|
| 4,072,400 | 2/1978 | Claypoole et al. . |
| 4,892,382 | 1/1990 | Story et al. . |
| 4,893,893 | 1/1990 | Claxton et al. . |
| 5,011,260 | 4/1991 | Marx et al. . |
| 5,293,442 | 3/1994 | Sayegh ..................................... 385/102 |
| 5,435,944 | 7/1995 | Shackleton ............................. 264/1.29 |
| 5,440,660 | 8/1995 | Dombrowski et al. .................. 385/102 |
| 5,627,932 | 5/1997 | Kiel et al. ................................. 385/102 |

FOREIGN PATENT DOCUMENTS

| | | |
|---|---|---|
| 0233805 | 8/1987 | European Pat. Off. . |
| 0303590 | 8/1988 | European Pat. Off. . |
| 0349312 | 1/1990 | European Pat. Off. . |
| 0527266A1 | 12/1991 | European Pat. Off. . |
| 4038827 | 6/1992 | European Pat. Off. . |
| 0510255 | 10/1992 | European Pat. Off. . |
| O303590A3 | 8/1988 | Germany . |
| 3900901 | 7/1990 | Netherlands . |

*Primary Examiner*—Mathieu D. Vargot

[57] ABSTRACT

A simplex optical fiber cable of this invention includes an optical fiber, a buffer preferably of nylon, surrounding and in contact with the optical fiber, a yarn layer with strength fibers, preferably aramid fibers, disposed about the buffer and a sheath preferably formed of polyvinyl chloride (PVC) surrounding and in contact with the yarn layer. In cross-section, the simplex optical fiber cable has a diameter less than 2.0 millimeters (mm), and thus is much smaller in diameter than optical fiber cables presently available. Preferably, if the buffer is relatively tin providing limited protection to the optical fiber, a slick substance such as talc is applied to an outer surface of the buffer before the yam layer is disposed thereon. The slick substance allows the buffer of the optical fiber to slide to a degree in contact with the yarn layer and thus reduces fatigue caused by axial movement of a ferrule of the connector terminating the optical fiber cable. On the other hand, if the buffer is relatively thick, a friction-reducing substance such as Moda-flo™ can be applied to the optical fiber to allow the buffer to be stripped relatively easily. A zip-cord duplex optical fiber cable of this invention includes essentially two simplex optical fiber cables with their respective sheaths joining at a middle portion along the axial length of the simplex optical fiber cables. Thus, in cross-section, the zip-cord duplex optical fiber cable has a figure-eight shape with a relatively thin portion in the middle which can be manually pulled apart to separate the zip-cord duplex optical fiber cable into separate simplex optical fiber cables. This feature of the invention allows the zip-cord duplex optical fiber cable to be split at its ends to allow connectors attached to respective ends of the optical fiber cables for connection to respective spaced connector receptacles. A second duplex optical fiber cable of this invention includes two simplex optical fiber cables arranged side-by-side with an oversheath extruded about and holding together the two simplex optical fiber cables. In cross-section, the two duplex optical fiber cables of this invention are less than 2.0 mm in height and 4.0 mm in width, and thus are much smaller than currently available duplex optical fiber cables. The invention also includes die assemblies and methods for making the simplex and duplex optical fiber cables.

11 Claims, 7 Drawing Sheets

SUB-MINIATURE OPTICAL FIBER CABLES, AND APPARATUSES AND METHODS FOR MAKING THE SUB-MINIATURE OPTICAL FIBER CABLES

RELATED APPLICATIONS

This application is a divisional application claiming priority to application Ser. No. 08/510,021; filed Aug. 1, 1995.

BACKGROUND OF THE INVENTION

1. Field of the Invention

This invention is directed to a sub-miniature optical fiber cable, and to apparatuses and methods for making the sub-miniature optical fiber cable.

2. Description of the Related Art

Local exchange carriers are increasingly using optical fiber signal transmission in central offices to accommodate the increasing demand for optical fiber systems such as fiber-to-the-home, fiber-to-the-curb, hybrid fiber-coax, digital loop carrier and interoffice carrier systems. The central offices are used to distribute optical fiber cables and to establish cross-connections between optical fiber systems and/or exchanges. At present, optical fiber cable is produced in standard sizes of 2.4 mm or 3 mm in diameter. Although these standard sizes may appear to be relatively small in diameter, because they are used in such large numbers in a central office, these standard sizes lead to significant congestion, complication and expense in a central office. In fact, to accommodate cross-connections between optical fiber systems or exchanges, central offices require a relatively large number of cabinets with troughs housing optical fiber jumper cables, and racks housing connectors to join optical fiber jumper cables together. The relatively large number of cabinets currently required in a central office to accommodate cross-connections for optical fibers, increases the size and space requirements for central offices and thus the expense of the central offices. Moreover, the relatively large standard sizes of optical fiber cables lead to congestion and complication in the central office which requires significant time, and therefore expense, for service persons to establish, replace, change or maintain cross-connections in the central offices. Further, the size of the optical fiber cable has a multiplicative effect on the size of the components that are used with the cable in the central office. Thus, if the optical fiber cable is relatively large, so must be the connectors which terminate and attach the optical fiber cable to other optical fiber cables, the size of the racks that house the connector receptacles, the troughs which house the optical fiber jumper cables, and the size of the cabinets used to house the racks and troughs. If the size of the optical fiber cables can be reduced, the connectors, racks, troughs and cabinets can be proportionally decreased in size. Also noteworthy is that the cost of the optical fiber cables, connectors and cabinets is proportional to the amount of materials used in the manufacture thereof. Therefore, by decreasing the size of the optical fiber cables, connectors and cables, significant cost-savings can be obtained. Thus, there is a need to reduce the size of optical fiber cables.

SUMMARY OF THE INVENTION

This invention overcomes the disadvantages noted above. In accordance with this invention, a simplex optical fiber cable includes a jacketed optical fiber at its core. The optical fiber is surrounded and contacted with a buffer made of plastic material such as nylon, polyesters or polyvinyl chloride (PVC). About the outer circumference of the buffer aramid yarn is disposed. A sheath of plastic material such as PVC surrounds and contacts the aramid yarn.

A duplex optical fiber cable in accordance with this invention includes two optical fibers with respective buffers and aramid yarn layers, which are positioned side-by-side in a sheath, preferably of PVC, covering and contacting the aramid yarn of both optical fibers and integrated together to form a continuous connection between portions of the sheath covering respective aramid yarn layers, buffers and optical fibers. In an alternative embodiment, a duplex optical fiber cable in accordance with this invention includes two simplex optical fiber cables as previously described, positioned side-by-side and having an oversheath, preferably of PVC, enclosing the two simplex optical fiber cables.

In cross-section, the diameter of the simplex optical fiber cable can range from 1.0 mm through 1.8 mm, but is preferably formed in standard sizes of about 1.2 mm and 1.6 mm. The simplex optical fiber cable of this invention is thus significantly smaller in diameter than the optical fiber cables presently available. Likewise, in cross-section, the duplex optical fiber cable of this invention ranges from 2.76 mm through 4.25 mm in width and from 1.60 mm through 2.10 mm in height, but preferably is formed in standard sizes of about 2.76 mm in width and 1.68 mm in height, or about 4.20 mm in width and 1.60 mm in height. Thus, the duplex optical fiber cable of this invention is much smaller in cross-section compared to duplex optical fiber cables presently available.

Thus, the simplex and duplex optical fiber cables of this invention are miniaturized relative to prior art optical fiber cables, and make possible the reduction of congestion, complication and size and space requirements presently required in central offices. These features of the simplex and duplex optical fiber cables of this invention considerably reduce the costs of establishing, operating and maintaining central offices.

In accordance with this invention, if the buffer surrounding the optical fiber is relatively thin in either the simplex or duplex cable configuration, a slick substance such as talc can be applied to the outer surface of the buffer. This feature of this invention allows for the buffer to slide in contact with its aramid yarn layer so that the optical fiber will not be overbent when the ferrule of a connector attached to an end of the optical fiber, forces the optical fiber in an axial direction along the length of the optical fiber cable as the connector is connected to a connector receptacle. Thus, the simplex and duplex optical fiber cables of this invention reduce damage or breakage of optical fibers caused by overbending or fatigue when a connector is coupled to a connector receptacle.

Also, in either the simplex or duplex cable configurations, if the buffer is relatively thick, a slick substance such as Modaflo™ can be applied to the outer surface of a coated optical fiber 4 so that the relatively thick buffer can more readily be stripped from the optical fiber.

In addition, the duplex optical fiber cables of this invention are advantageous in that the respective buffers of the two optical fibers in each duplex optical fiber cable of this invention are individually wrapped with aramid yarn as opposed to wrapping aramid yarn around the buffers of both optical fibers as done in one type of optical fiber cable presently available. By individually wrapping the two optical fiber buffers in the duplex optical fiber cable of this invention, the need for bifurcation kits to connect the duplex optical fiber cable to single connectors, is eliminated.

Because bifurcation kits have parts which force the diameter of the optical fiber cable to increase greatly, the elimination of the need for bifurcation kits effectively reduces the size of the duplex optical fiber cable of this invention relative to presently available duplex optical fiber cables. Also, bifurcation kits are relatively expensive, so the elimination of the need to use bifurcation kits in the duplex optical fiber cables of this invention provides significant cost-savings relative to duplex optical fiber cables which require bifurcation kits.

These together with other objects and advantages, which will become subsequently apparent, reside in the details of construction and operation as more fully hereinafter described and claimed, reference being had to the accompanying drawings, forming a part hereof, wherein like numerals refer to like parts throughout.

BRIEF DESCRIPTION OF THE DRAWINGS

The present invention can be better understood with reference to the following drawings. The drawings are not necessarily to scale, emphasis instead being placed upon clearly illustrating principles of the present invention.

DESCRIPTION OF THE PREFERRED EMBODIMENTS

Figure 1:
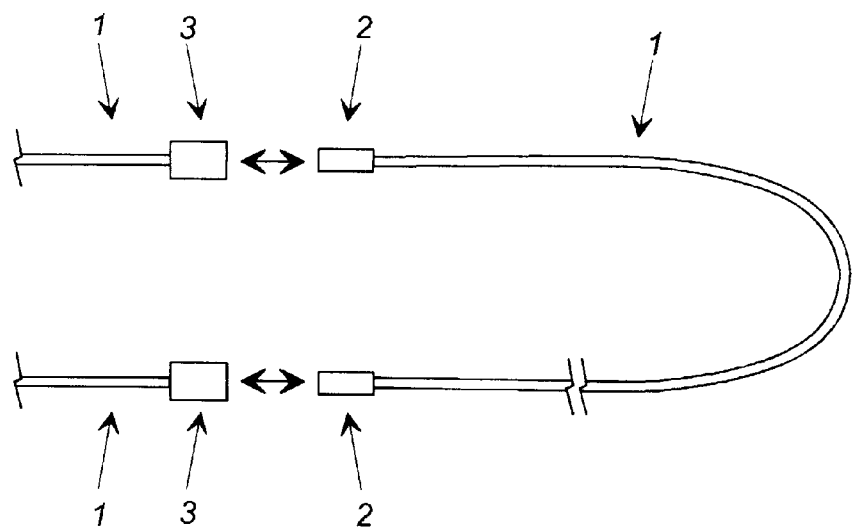
FIG. 1 is a diagram of an optical fiber jumper cable in accordance with his invention with connectors at the terminal ends thereof, showing the operation of connecting the connectors to connector receptacles coupled to respective optical fiber cables.

In FIG. 1, an optical fiber cable 1 has connectors 2 attached to the terminal ends thereof The connectors 2 can be ST, FC, or SC connectors, for example. The connectors 2 can be connected by insertion into respective connector receptacles 3. The connector receptacles 3 are connected to respective optical fiber cables I for distribution to remote locations.

In a central office, connector receptacles 3 are typically housed in racks (not shown) in cabinets (not shown). Also, the central office houses the optical fiber cables 1 in troughs (not shown) in and running between the cabinets. Because a relatively large number of cross-connections are required in a central office to establish connections to transmit optical signals from various remote locations to others, a correspondingly large number of connector receptacles 3 and optical fiber cables 1 are housed in the central office. The optical fiber cable 1 of this invention is relatively small in diameter compared to currently-used optical fiber cables, so the use of the optical fiber cables 1 of this invention greatly reduce confusion, congestion, and complication in establishing, organizing, replacing or maintaining cross-connections in the central office. In addition, the relatively reduced size of the optical fiber cable 1 of this invention allows for a reduction in the size of the connectors 2 and the connector receptacles 3, a feature which allows for the reduction of cabinet sizes relative to currently-used cabinets. In turn, the reduction of the size of the cabinets used in the central office leads to a reduction in the amount of floor space required for the cabinets. Because the amount of floor space in a central office determines the expense of building, leasing, and/or operating a central office, this reduction in the cabinet sizes used in a central office leads to a significant cost savings for the central office.

Figure 2:
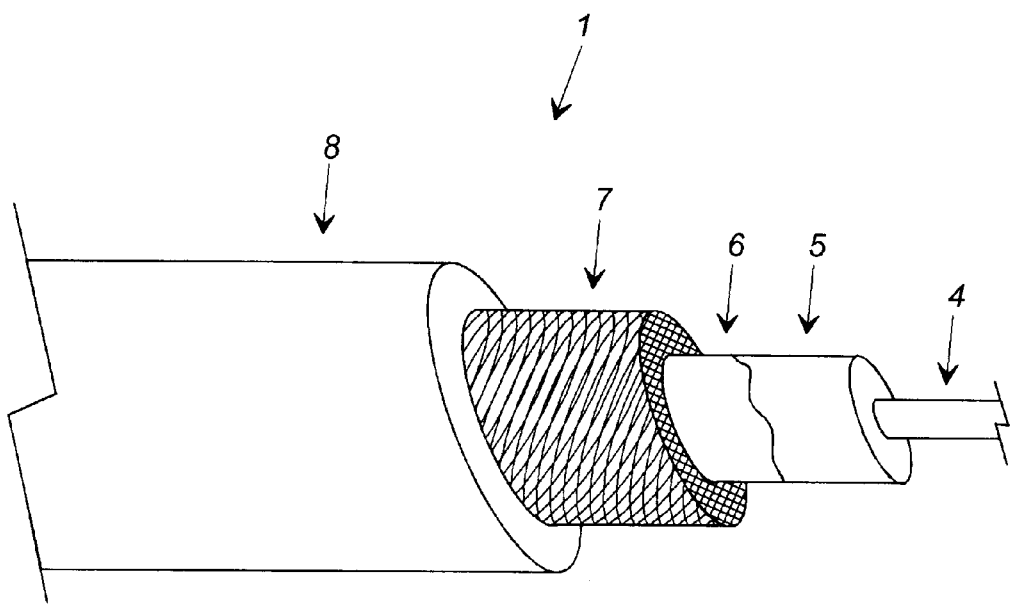
FIG. 2 is a perspective cutaway view of a simplex optical fiber cable in accordance with this invention.

In FIG. 2, a simplex optical fiber cable 1 of this invention is shown in a perspective cutaway view. The simplex optical fiber cable 1 includes at its core an optical fiber 4. Preferably, the optical fiber 4 is coated with a plastic material such as ultraviolet (UV)-curable acrylate, to provide a degree of protection for the optical fiber 4. Typically, the coated optical fiber 4 has a diameter of 0.254 mm (0.010"). Surrounding the optical fiber 4 and in contact with the outer surface thereof, a buffer 5 is formed. The buffer 5 is preferably formed of a plastic material such as nylon, although other types of plastic material can be used to form the buffer 5. Nylon material is preferred for the buffer 5, however, because it has a degree of stiffness which is relatively high for plastic materials. Therefore, the buffer 5 composed of nylon can be formed with a diameter which is relatively thin, and yet the nylon buffer 5 is not inhibited by its relatively thin diameter from providing significant protection from overbending of the optical fiber 4. Thus, the use of nylon to form the buffer 5 allows for miniaturization of the size of the optical fiber cable relative to other optical fiber cables.

If the buffer 5 is relatively thick (900 mm in diameter, for example), a coating of Modaflo™ (a mixture of Teflon® and acetone is applied to the coated optical fiber 4 before forming the buffer 5 thereon. Because the hoop stress of the buffer 5 upon the optical fiber 4 is relatively high if the buffer 5 is relatively thick, the use of the Modaflo™ coating helps to reduce friction between the buffer 5 and they optical fiber 4 so that the buffer 5 can readily be stripped off of the optical fiber 4. For example, the Modaflo™ coating helps to strip off the relatively thick buffer 5 when attaching a connector to the simplex optical fiber cable 1.

On the other hand, if the buffer 5 is relatively thin (e.g., 500 microns in diameter) a relatively slick substance 6 is applied about the outer surface of the buffer 5. The substance 6 can be talc, for example. The substance 6 facilitates sliding of the buffer 5 relative to a yam layer so that the buffer 5, and, therefore the optical fiber 4, will not be overbent when the buffer 5 is forced to slide relative to the yarn layer 7, for example, when connecting a connector attached to the end of the optical fiber cable 1 to a connector receptacle. The substance 6 is not necessary if the buffer 5 is relatively thick, because in this case the buffer 5 is sufficiently strong to prevent the optical fiber 4 from being overbent. About the outer surface of the buffer 5, the yarn layer 7 is composed of strands either laid straight (i.e., parallel with the optical fiber 4) or helically wrapped. Preferably, the yam layer 7 includes yam strands with aramid strength fibers which have relatively high strength and resistance to stress and strain. The yarn layer 7 prevents the optical fiber 4 from being damaged by overbending. Also, because the yarn layer 7 is composed of relatively strong aramid fibers, the yarn layer 7 is subject to relatively little fatigue over time. In addition, the yarn layer 7 provides significant protection for the buffer 5 and the optical fiber 4 from impact or shock with an object, or from inadvertent cutting or tearing of the optical fiber cable 1. About the outside surface and in contact with the outer surface of the yarn layer 7, a sheath 8 is formed. The sheath 8 is formed from a plastic material such as polyvinyl chloride (PVC) (or more generally, plenum, riser and non-halogen rated plastics). The sheath 8 provides structural strength for the optical fiber cable 1 and is flexible to a degree, but also is sufficiently resilient to prevent the optical fiber 4 from being damaged by overbending.

In diameter, the simplex optical fiber cable of FIG. 2 ranges from 1.0 mm to 1.8 mm in diameter, and thus is much smaller than the standard sizes of 2.4 mm or 3 mm in diameter for optical fiber cables that are typically available. More specifically, the optical fiber 4 has a diameter of 250 microns (±15 microns) in diameter, the buffer 5 ranges from 0.1 mm to 0.31 mm in radial thickness, the yarn layer 7 ranges from 0.22 mm to 0.52 mm in radial thickness, and the sheath 8 ranges in thickness from 0.15 mm to 0.25 mm. Preferably, 15 the simplex optical fiber cable 1 of this invention has standard sizes of about 1.2 mm and 1.6 mm in diameter. For the first standard size of about 1.2 mm, the coated optical fiber 4 is about 0.250 mm in diameter, the buffer 5 is about 0.13 mm in radial thickness, the yarn layer 7 is about 0.22 mm in radial thickness, and the sheath 8 is about 1.8 mm in diameter. For the second standard size of the simplex optical fiber cable 1 of this invention, the coated optical fiber 4 is about 0.25 mm in radial thickness, the buffer 5 is about 0.32 mm in diameter, the yarn layer 7 is about 0.22 mm in radial thickness, and the sheath 8 is about 0.1 mm in radial thickness.

Figure 3:
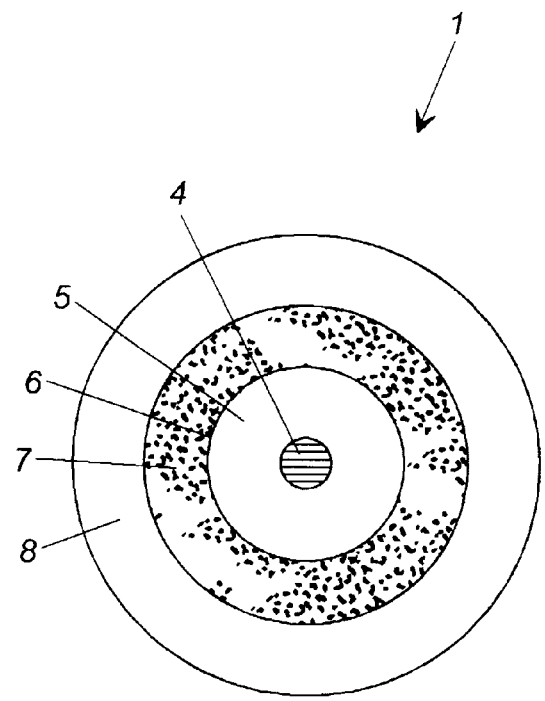
FIG. 3 is a cross-sectional view of the simplex optical fiber cable.

In FIG. 3, the simplex optical fiber cable 1 of FIG. 2 is shown in cross-section. The elements of FIG. 3 were previously described with respect to FIG. 2, but the cross-sectional view of FIG. 3 is provided to give an understanding of the simplex optical fiber cable 1 of this invention in three-dimensions.

Importantly, if the nylon buffer 5 is formed with a diameter of about 500 microns, the inventors have found that the buffer 5 can be stripped with a force of 3 pounds or less, a feature which greatly eases the operation of attaching a connector to the optical fiber cable 1, for example. The inventors have determined that a diameter of about 900 microns for the buffer 5 is too great to strip the buffer 5 without applying an intermediate layer of a substance such as Modaflo™, which allows the 900 micron nylon buffer to be stripped from the optical fiber 4. In any case, the maximum diameter of the nylon buffer 5 for which the buffer 5 can be stripped with a force of 3 pounds or less lies between 900 and 500 microns.

Figure 4:
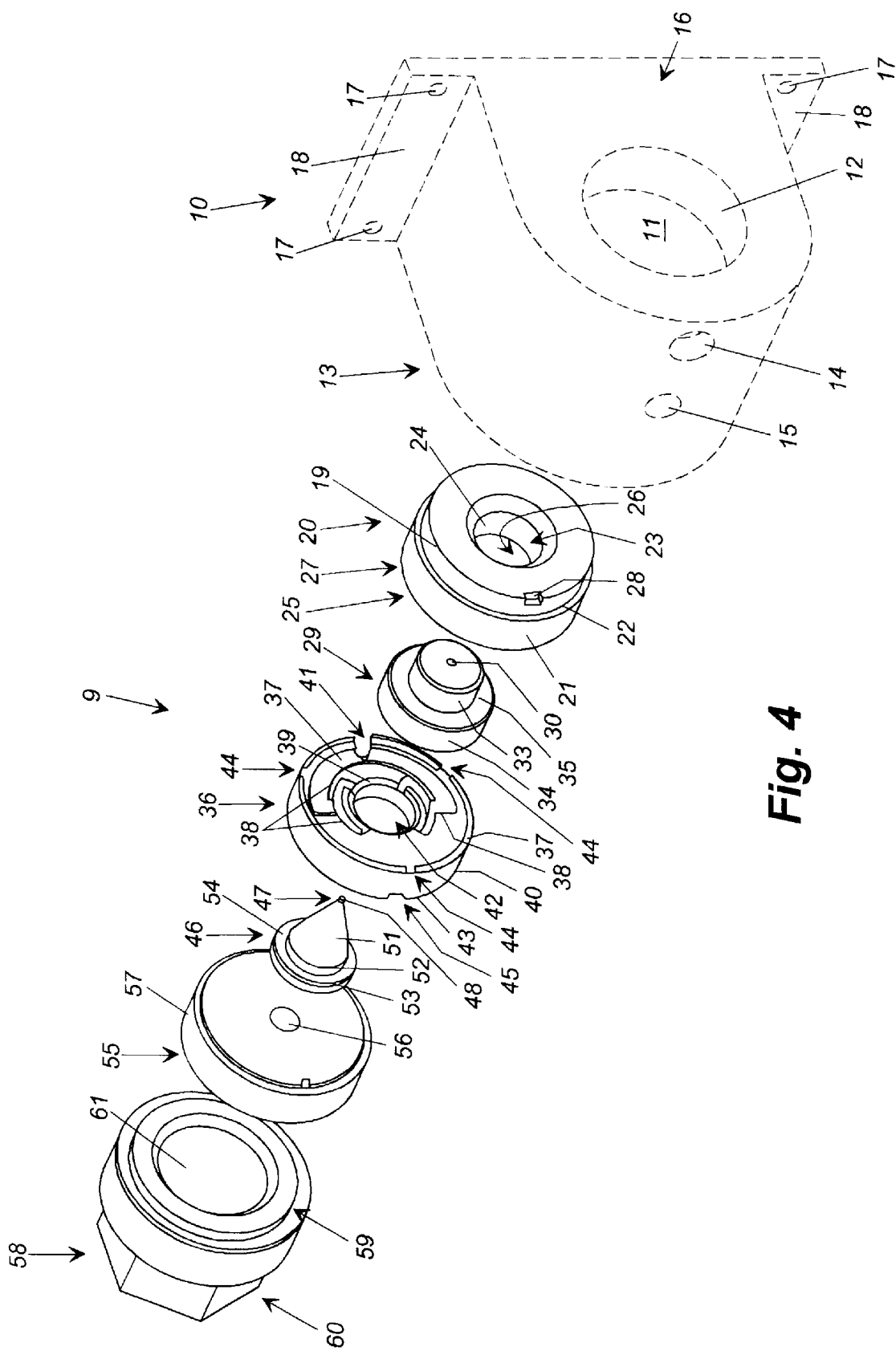
FIG. 4 is an exploded perspective view of a crosshead assembly for making the simplex optical fiber cable.

In FIG. 4, a crosshead assembly 9 for making the simplex optical fiber cable 1 of this invention is shown. The crosshead assembly 9 includes a crosshead 10 which can be a standard type of crosshead widely used in the plastics extrusion industry. The crosshead 10 defines an open cavity 11 and an aperture 12 at a first end of the crosshead 10 which communicates with the cavity 11. Opposite its first end, the crosshead defines a second, open end formed by the opening of the cavity 11. At the second end of the crosshead 10 about the cavity 11, are defined threads 13 (not shown in FIG. 4, but shown in FIG. 5). The crosshead 10 also defines on its side surface an aperture 14 to receive an alignment pin (not shown) to achieve proper orientation of the parts of the crosshead assembly 9. The crosshead 10 further defines an aperture 15 on its side surface, to allow insertion of a temperature probe (not shown) for monitoring the temperature of extruded plastic material. The crosshead 10 also includes a flat surface 16 which can be engaged with a support (not shown) with screws (not shown) threaded through respective apertures 17 defined in flanges 18 of the crosshead 10.

Figure 5:
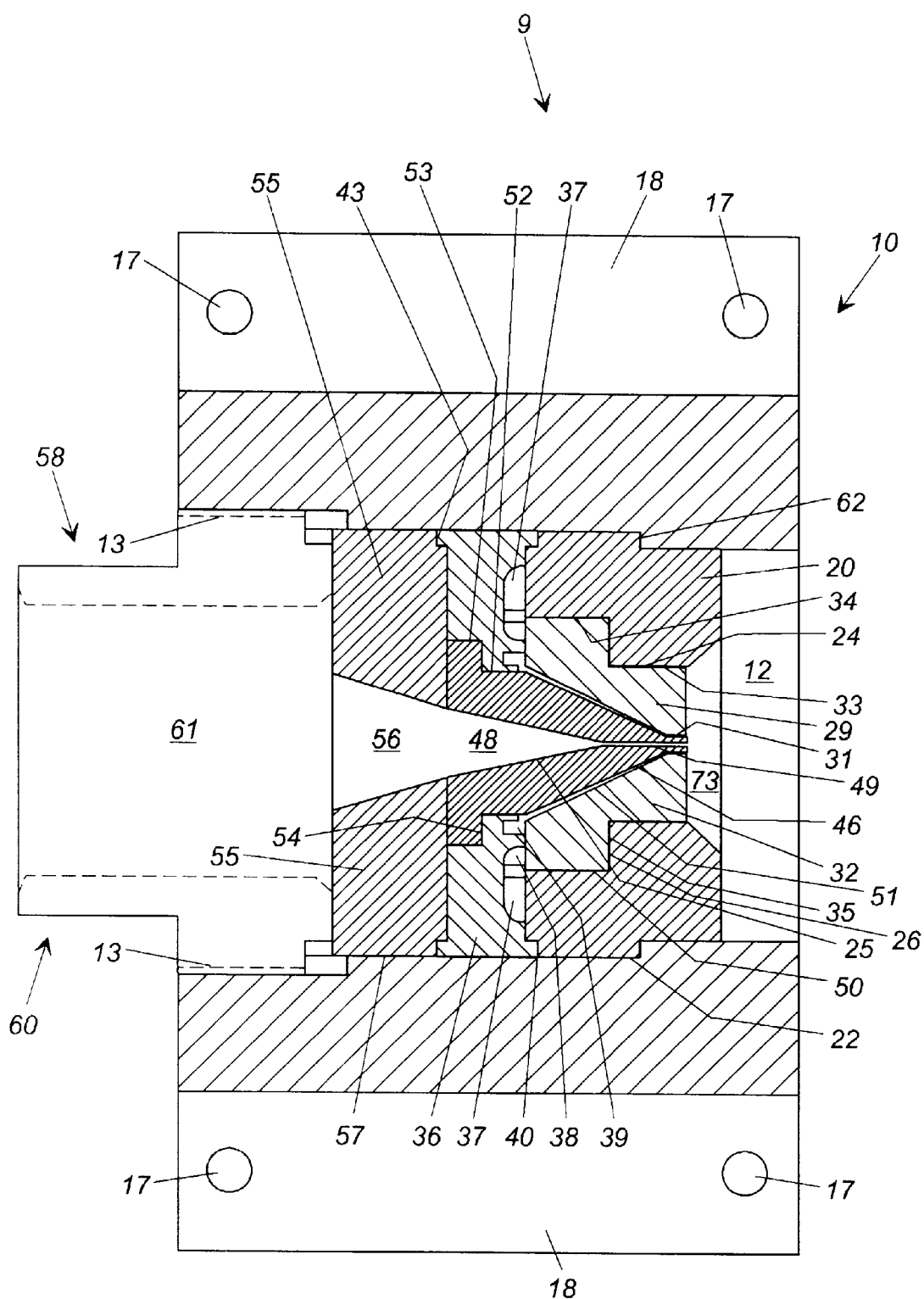
FIG. 5 is a cross-sectional diagram of the crosshead assembly for making the simplex optical fiber cables, shown in its assembled configuration.

The aperture 12 is circular in cross-section and sized to receive and hold, when inserted into the second open end and through the cavity 11 defined in the crosshead 10, the cylindrical surface 19 situated at a first end of a die holder 20. On a second end opposite its first end, the die holder 20 also has a cylindrical surface 21 with a diameter larger than that of the cylindrical surface 19 and thus defining a ledge 22 which, when inserted into the crosshead 10, engages with an inner surface of the first end of the crosshead 10 in proximity to the aperture 12 to fix the die holder 20 in position against the inside surface of the first end of the crosshead 10. The die holder 20 also defines at its center an aperture 23 extending along an axial length of the die holder 20 so that the die holder 20 is effectively ring- or disc-like in shape. The aperture 23 is defined in the die holder 20 so that the die holder 20 has two cylindrical surfaces 24, 25 (only surface 24 is visible in FIG. 4, but FIG. 5 shows both surfaces 24 and 25). The cylindrical surface 25 has a greater diameter than the cylindrical surface 24, thus defining a step 26 (not shown in FIG. 4, but shown in FIG. 5) therebetween. About an outer periphery on the second side of the die holder 20, a recessed portion 27 is defined adjacent the cylindrical surface 21. The purpose of the recessed portion 27 will be described later in this document. In addition, the die holder 20 has a recess 28 for receiving an alignment pin (not shown) inserted through the aperture 14 of the crosshead 10, to orient and lock the die holder 20 in the crosshead 10.

The crosshead assembly 9 also includes a die 29. The die 29 defines an aperture 30 centered in and extending along the axial length of the die 29. The aperture 30 is defined in the die 29 such that it has a cylindrical surface 31 (not shown in FIG. 4, but shown in FIG. 5) in proximity to a first end of the die 29, and such that it has a funnel-like portion 32 (not shown in FIG. 4 but shown in FIG. 5) in proximity to a second end of the die 29. The funnel-like portion 32 is defined so that it narrows from the second end toward the first end of the die 29 along an axial length thereof until meeting with the cylindrical surface 31. The cylindrical surface 31 of the die 29 shapes the molten plastic material to form the outside surface of the sheath 8 of the simplex optical fiber cable 1 of this invention, as will be explained later in this document. The die 29 includes outer cylindrical surfaces 33, 34. When the die holder 20 is assembled with the die 29, the surface 33 is inserted into the aperture 23 defined by the die holder 20. The cylindrical surface 34 has a larger diameter than that of the cylindrical surface 33, and thus defines a ledge 35 which engages with a second end of the die holder 20 when the die holder 20 is assembled together with the die 29. Also, when the die 29 is inserted into the die holder 20, the second ends of the die holder 20 and the die 29 are flush and define a substantially uniform flat surface. This flat surface engages with a first end of a core tube 36 to enclose passages 37, 38 and annular recess 39 defined on the first end face of the core tube 36. To hold the core tube 36 in position relative to the die holder 20, the core tube 36 has a rim 40 disposed about an outer circumference of the core tube 36, which engages with the recessed portion 27 defined about the outer circumference of, and on the second end of, the die holder 20. The first end of the core tube 36 defines a notch 41 which receives molten plastic material such as nylon or PVC for the extrusion of the sheath 8 of the simplex optical fiber cable 1. When enclosed by the flat surfaces of the second ends of the die 29 and the die holder 20, the notch 41 together with a portion of the cylindrical surface 21 of the die holder 20 define an aperture to receive the molten plastic material. The passages 37, 38 are U-shaped in cross-section and together with the respective flat surfaces of the second ends of the die holder 20 and the die 29, define channels through which the molten plastic material flows. The passages 37, 38 split the molten plastic material flow from the notch 41 and channel the split flows of molten plastic material to opposite sides of a circular aperture 42 defined at a center axis of the core tube 36. The passages 38 further split the flow from respective passages 38 and direct the flow of plastic material to the annular recess 39 at four spaced locations provided at 90 degree angular intervals about the edge of the circular aperture 42. The core tube 36 also has a rim 43 which extends from the second end of the core tube 36. Defined symmetrically in the rims 40, 43 are opposing notches 44, 45 (not all of which are shown). The notches 44, 45 allow insertion of the tip of a screwdriver, for example, to disassemble the die holder 20 and the entry die 55 from the core tube 36.

A core tube insert 46 has a tip 47 with an aperture 48 formed therein. The aperture 48 is defined by the core tube insert 46 such that it extends along the axial length of the core tube insert 46. At a first end of the core tube insert 46, the aperture 48 has a cylindrical portion 49 (not shown in FIG. 4, but shown in FIG. 5). At a second end of the core tube insert 46, the aperture 48 has a funnel-like portion 50 (not shown in FIG. 4, but shown in FIG. 5) which converges in a direction from the first end to the second end of the core tube insert 46 until meeting with an end of the cylindrical portion 49 inside of the core tube insert 46. Adjacent the tip 47, the core tube insert 46 has an outer conical portion 51 about which molten plastic material is extruded by the passages 37, 38 and the annular recess 39 of the core tube 36. Also, the core tube insert 46 includes outer cylindrical surfaces 52, 53. The cylindrical surface 52 adjacent an end of conical portion 51, has a diameter smaller than that of the cylindrical surface 53 and thus defines a ledge 54 between the cylindrical surface 52, 53. When the core tube insert 46 is assembled with core tube 36, the ledge 54 engages with the second side of the core tube 36, to hold the core tube insert 46 in position and prevent the core tube insert 46 from moving in a direction toward the right in FIG. 4. Also, the cylindrical surface 52 is sized to fit snugly in the aperture 42 defined in the core tube 36 to hold the core tube insert 46 firmly in position therein. When the core tube insert 46 is assembled together with the core tube 36 and the die 29, the conical portion 51 extends through the aperture 42 and the tip 47 extends into the aperture 30 at the second side of the die 29.

An entry die 55 defines a funnel-like aperture 56. The funnel-like aperture 56 converges or tapers from the second end of the entry die 55 to its first end, and so is relatively open at the second end of the entry die 55, and relatively closed at the first end of the entry die 55. The entry die 55 also has a recess 57 formed about the periphery of the entry die 55 on its first end, which receives the rim 43 of the core tube 36 to aid in holding the core tube 36, the core tube insert 46 and the entry die 55 together when assembled. A crosshead nut 58 has at its first end threads 59 and at its second end hexagonal surfaces 60. The threads 59 mate with corresponding threads 13 of the crosshead 10. When threaded to the crosshead 10, the crosshead nut 58 holds the die holder 20, the die 29, the core tube 36, the core tube insert 46, and the entry die 55 in assembly inside of the cavity 11 of the crosshead 10. The hexagonal surfaces 60 allow a wrench (not shown) or the like to be used to screw the threads 59 of the crosshead nut 58 onto corresponding threads 13 of the crosshead 10. The crosshead nut 58 defines an aperture 61 extending along the axial length thereof. When assembled with the entry die 55, the aperture 61 communicates with the aperture 56 defined in the entry die 55.

The cross head 10, die holder 20, die 29, core tube 36, core tube insert 46, the core guide 55 and the cross head nut 58 can all be made of metal material such as stainless steel or tool steel.

In FIG. 5, the crosshead assembly 9 for making the simplex optical fiber cable 1 in accordance with this invention, is shown in cross-section. The crosshead assembly 9 is assembled by inserting the first side of the die 29 into the second side of the die holder 20. When so inserted, the outer cylindrical surface 33 of the die 29 meets with the inner cylindrical surface 24 of the die holder 20, the ledge 35 abuts step 26 and the outer cylindrical surface 34 contacts the inner cylindrical surface 25. The step 26 and the ledge 35 fix the die 29 in position and prevent the die 29 from moving toward the right in FIG. 5. The core tube 36 is joined with the die holder 20 so that the rim 40 meets with recessed portion 27, thus holding the die 29 between the die holder 20 and the core tube 36. The core tube insert 46 is inserted into the second side of the core tube 36, so that tip 47 of the core tube insert 46 is inserted through the core tube 36 and into the die 29 so that the tip 47 is situated at the first side of the die 29 in the aperture 30. When so inserted, the conical portion 51 of the core tube 46 opposes the funnel-like portion 32 and the cylindrical surfaces 52, 53 and ledge 54 meet with respective surfaces defining the aperture 42 in the core tube 36. The entry die 55 is joined with the core tube 36 so that its recess 57 meets with the rim 43. The assembled die holder 20, die 29, core tube 36, core tube insert 46 and entry die 55 are inserted into the cavity 11 of the crosshead die 10 until the ledge 22 meets with an annular step 62 defined in the crosshead 10. The assembled die holder 20, die 29, core tube 36, core tube insert 46 and entry die 55, are held in position in the crosshead 10 by screwing the threads 59 of the crosshead nut 58 into the threads 13 of the crosshead 10.

To make the optical fiber cable 1 of FIGS. 2 and 3, the optical fiber 4 is manufactured and preferably coated using well-known techniques. If the buffer 5 is to be relatively thick (900 microns in diameter, for example), a coating of a friction-reducing substance such as Modaflo™ is applied to the optical fiber 4, for example, by drawing the optical fiber 4 through a container holding such substance. The buffer 5 is then extruded onto the optical fiber 4 using well-known techniques. If the buffer 5 is relatively thin (500 microns in diameter, for example), the coating of the substance such as Modaflo™ can be omitted. On the other hand, if the buffer 5 is relatively thick (i.e., 900 microns in diameter) the slick substance 6 is applied to the buffer 5 after extrusion of the buffer 5, either by spraying or dusting the slick substance 6 on the buffer 5, or by running the optical fiber 4 through a container holding the slick substance 6. The straight-laying or helical wrapping of the yarn layer 7 on the buffer 5 can be performed by an organizer (not shown) situated to the left in FIG. 5 relative to the crosshead assembly 9. Such organizers are well-known in the optical fiber cable industry. The organizer can be a circular ring with holes formed therein to receive strands of the yarn 7. If the strands of yarn are to be laid straight (i.e., parallel with the optical fiber 4), the strands of yarn are advanced through the organizer's holes and guided into contact with the buffer 5 advanced by a motor through the center of the organizer. Alternatively, if the yarn strands are to be helically wrapped onto the buffer 5, the organizer ring is rotated by a motor (not shown) which causes the strands of yarn 7 to be helically wrapped about the buffer 5 as it is drawn through the center aperture of the circular ring. The optical fiber 4 with buffer 5 and aramid yarn layer 7, are inserted from the left side of FIG. 5 into apertures 61, 56, 48 and through apertures 23 and 12 of the crosshead assembly 9 of FIGS. 4 and 5. The apertures 56 and 48 define a funnel shape which tends to guide and ease insertion of the end of the optical fiber 4, the buffer 5 with applied substance 6, and wrapped aramid yarn 7, through the crosshead assembly 9. Thus, the funnel shape of the apertures 56, 48 greatly eases the preparation of the crosshead assembly 9 for extrusion of the sheath 8 relative to previously-used crosshead dies.

The coated optical fiber 4, buffer 5 (with applied substance 6, if used), and yarn layer 7 are drawn through the apertures 61, 56, 48, 23 and 12 with a motor (not shown). Molten plastic material is forced into the crosshead assembly 9 and through the notch 41 into passages 37, 38 which split the flow of molten plastic material from the notch 41 into split flows supplied at separated locations about the circumference of the annular recess 39 of the core tube 36. The annular recess 39 evenly distributes the molten plastic material about the annular surface 39 of the core tube insert 46. The molten plastic material flows in a passage defined by the outer surface of the conical portion 51 of the core tube insert 46 and the inner surface of the aperture 30 defined in the die 29. Advantageously, the channel defined between the outer surface of the conical portions 51 of the core tube insert 36 and the inner surface of the funnel-like portion 32 of the die 29 cause the flow of molten material to converge toward the tip 47 of core tube insert 46, a feature which ensures that the flow of molten plastic material is uniformly distributed and continuous about the circumference of the tip 47. The molten plastic material flows over the outer surface of the tip 47 and the inner surface of the cylindrical surface 31 defining the aperture 30 at the first side of the die 29, forming a sheath 8, ring-like in cross-section, about the optical fiber 4, the buffer 5, (with the applied substance 6, if used), and the yarn layer 7 as they are drawn through the crosshead assembly 9. When cooled sufficiently, the sheath 8 constricts to a degree on the yarn layer 7 to form the simplex optical fiber cable 1 of this invention.

The molten plastic material is extruded at a temperature of about 360° F. and cooled by immersion in 40°–60° F. water.

Importantly, should the die 20, the core tube 36 and/or the core tube insert 46 become clogged with plastic material, they can be readily replaced individually without the expense of replacing the entire crosshead assembly 9, a feature which provides significant cost-savings relative to previously-used dies.

Figure 6:
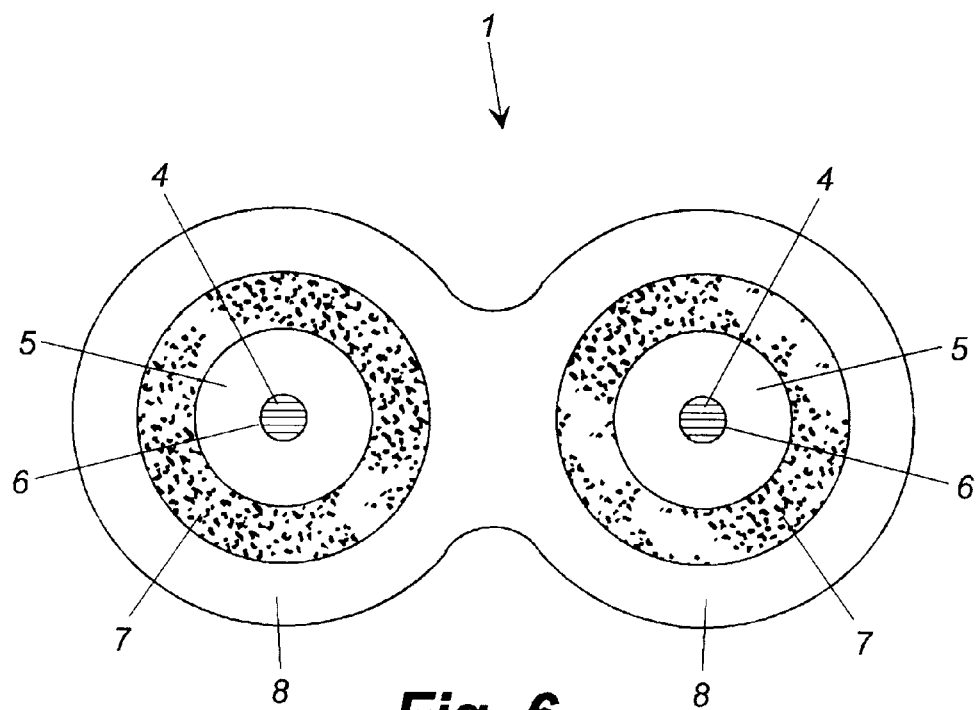
FIG. 6 is a cross-sectional view of a duplex optical fiber cable in accordance with this invention.

FIG. 6 is a cross-sectional diagram of a first embodiment of a duplex optical fiber cable 1 in accordance with this invention. Essentially, the first embodiment of the duplex optical fiber cable 1 includes two simplex optical fiber cables 1 (as shown in FIGS. 2 and 3), but with the respective sheaths 8 of the two simplex optical fiber cables 1 being formed such that they have a continuous connection between the two simplex optical fiber cables 1. The first embodiment of the duplex optical fiber cable 1 is called a zip-cord configuration and can be pulled apart at the middle connecting portion of the sheath 8 to allow separation between the two duplex optical fiber cables 1 so that respective connectors can be attached to respective ends of each optical fiber 4. This separation of the ends of the optical fiber cable 1 into two simplex optical fiber cables 1 allows the connector to be connected to spaced connector receptacles. After splitting the end of the duplex optical fiber cable 1 at the middle portion along a length sufficient to connect the optical fibers 4 to respective spaced connector receptacles 3, the duplex optical fiber 1 can be taped with an adhesive tape about its circumference so that the zip-cord duplex optical fiber cable 1 will not further split at its middle portion. This feature of the invention eliminates the need for bifurcation kits required to split the terminal end of previously-used miniature duplex optical fiber cables for the attachment of connectors thereto. Because a bifurcation kit has components which greatly increase the diameter of a duplex optical fiber cable to which the bifurcation kit is attached, the duplex optical fiber cable 1 of this invention is substantially reduced in size compared to previously-used optical fiber cables, a feature which leads to reduced congestion in the racks and troughs of central office cabinets.

In cross-section, the zip-cord duplex optical fiber cable 1 of this invention can range in size from 2.20 mm through 4.25 mm in width and from 1.25 mm through 2.00 mm in height (with an optical fiber of 0.254 mm in diameter, an optical fiber buffer of 0.1–0.34 mm in radial thickness, a yarn layer of 0.22–0.52 mm in radial thickness and a sheath of 0.15–0.25 mm in radial thickness but preferably formed in standard sizes of about 2.7 mm in width and 1.68 mm in height, or about 3.55 mm in width and 1.60 mm in height (for the first standard size, the optical fiber is 0.254 mm in diameter, the buffer is 0.13 mm in radial thickness, the yarn layer is 0.22 mm in radial thickness and the sheath is 0.18 mm in radial thickness, and for the second standard size the optical fiber is 0.254 mm in diameter, the buffer is 0.32 mm in radial thickness, the yarn layer is 0.22 mm in radial thickness and the sheath is 0.18 mm in radial thickness). Thus, the zip-cord duplex optical fiber cable 1 of this invention is much smaller in cross-section compared to duplex optical fiber cables presently available.

Figure 7:
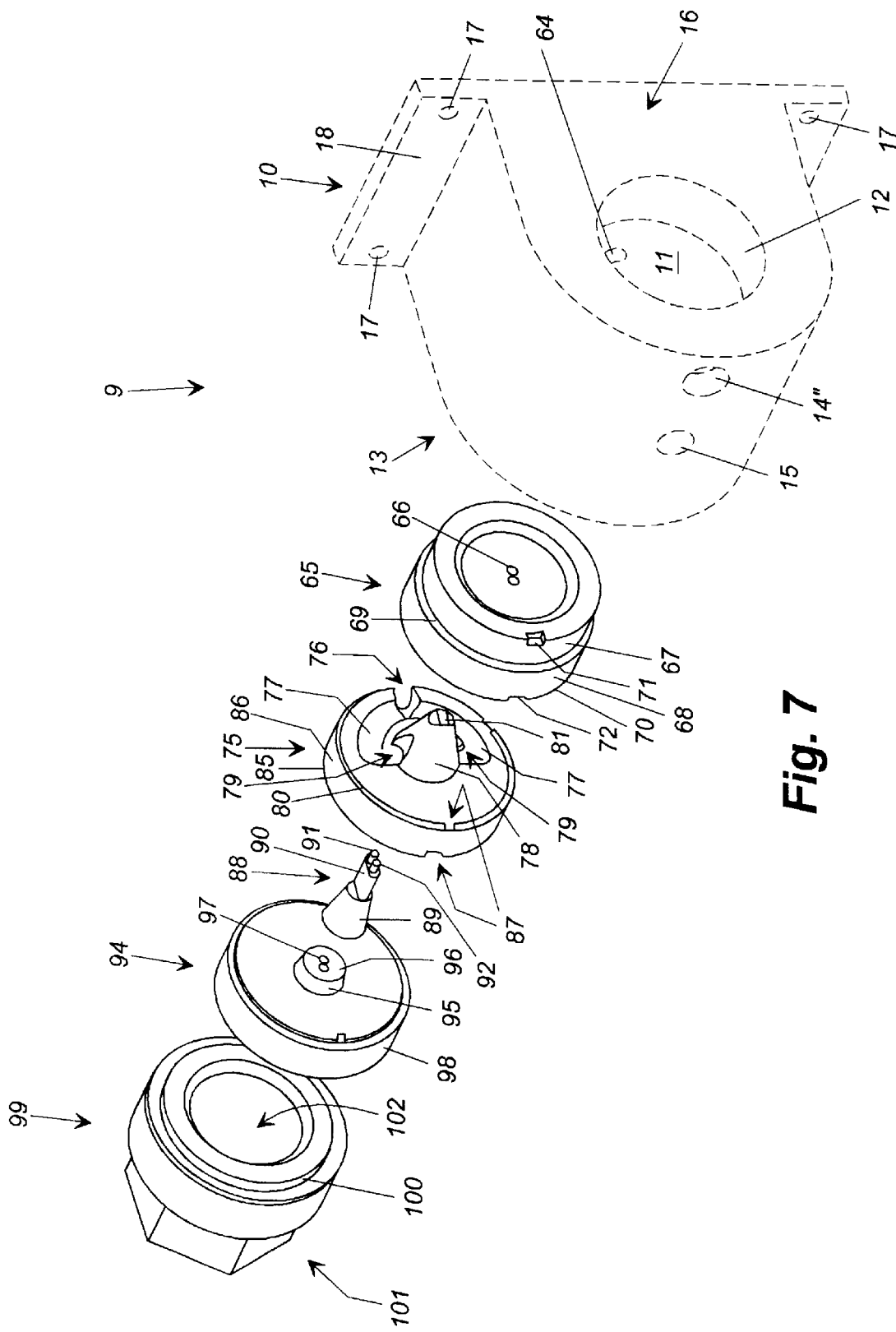
FIG. 7 is an exploded perspective view of a crosshead assembly for making the duplex optical fiber cable of FIG. 6.

FIG. 7 is an exploded perspective view of a crosshead assembly 9 for making the zip-cord duplex optical fiber cable 1 of this invention. The crosshead 10 has similar components of those explained previously with respect to FIG. 4, so an explanation of these elements will be omitted here. The crosshead assembly 9 of FIG. 7 also includes a die 65 defining a figure-eight-shaped aperture 66 at a first end of the die 65. The aperture 66 had a shape conforming to two tubes placed side-by-side such that the tubes intersect and have an open space at the intersecting portion thereof. The die 65 also defines outer cylindrical surfaces 67, 68. The cylindrical surface 67 has a diameter less than that of the cylindrical surface 68 so that the cylindrical surfaces 67, 68 define a ledge 69 therebetween. When inserted into the cavity 11 of the crosshead die 10 of FIG. 7, the ledge 69 meets with the face of annular step 62 (not shown in FIG. 7, but shown in FIG. 8) and thus prevents the die 65 from moving toward the right in FIG. 7. The die 65 also has a rim 70 extending from a second end of the die 65 from the outer periphery of the cylindrical surface 68. The die 65 also defines slots 71, 72. The slot 71 receives an alignment pin inserted through the aperture 14 of the crosshead 10, to align and lock the position of the die 65 in the crosshead 10. The slot 72 allows for the tip of the screwdriver or the like to be inserted into the slot 72 to separate the die 65 from other parts of the crosshead assembly 9. Centered at its second side and extending along the axial length thereof the die 65 defines a conical surface 73 (not shown in FIG. 7, but shown in FIG. 8) which converges from the second side to the first side of the die 65. The conical surface 73 defines an aperture 74 which communicates with the figure-eight-shaped aperture 66.

The crosshead assembly 9 of FIG. 7 also includes a core tube 75 defining a notch 76 at one side thereof. The notch 76 receives molten plastic material from the aperture 64 of the crosshead 10, to extrude the sheath 8 of the zip-cord duplex optical fiber cable 1 of this invention. On its first end face, the core tube 75 defines passages 77 which split the flow of molten plastic material from notch 76 and guide the split flows of molten plastic material to opposite sides of a conical portion 78 disposed on the first end of the core tube 75 and extending along the axial length thereof. The conical portion 78 has recessed surfaces 79 which guide respective split flows along the conical portion 78. Through the center of the conical portion 78, an aperture 81 is defined which runs from the tip end of the conical portion 78 along the axial length of the core tube 75. The aperture 81 is defined at the first end of the core tube 75, by a surface 82 (not shown in FIG. 7, but shown in FIG. 8) which in cross-section has two parallel, opposing sides with respective opposing semicircular ends meeting with respective ends of the opposing sides. Communicating with the aperture 81 defined at the first end of the core tube 75, a conical surface 83 (not shown in FIG. 7, but shown in FIG. 8) is defined in proximity to the second end of the core tube 75. Between the adjoining ends of the surface 82 and the conical surface 83, a step 84 (not shown in FIG. 7, but shown in FIG. 8) is defined in the core tube 75. The core tube 75 has a rim 85 extending from the second end thereof from the outer periphery of cylindrical side surface 86 of the core tube 75. The core tube 75 also includes opposing notches 87 to allow the crosshead assembly 9 to be disassembled using the tip of a screwdriver, for example.

The crosshead assembly 9 for making the zip-cord duplex optical fiber cable 1 of this invention also includes a core tube insert 88 including a conical portion 89 with an extension 90 protruding from and formed integrally therewith. In cross-section, the extension 90 has outer surfaces with two opposing, parallel sides and respective semicircular surfaces at the respective ends of the opposing, parallel sides. Extending from the extension 90, two parallel tubes 91 are disposed. The tubes 91 extend along the axial length of the core tube insert 88 from its first end to a location in near proximity to the second end of the core tube insert 88. The tubes 91 have inner surfaces defining respective apertures 92. In proximity to the second end of the core tube insert 88, the core tube insert 88 defines conical surfaces 93 communicating with the apertures 92 defined by the tubes 91. The conical surfaces 93 are relatively open at the second end of the core tube insert 88, but converge in a direction toward the first end of the core tube insert 88 until meeting with respective ends of the tubes 91.

Figure 8:
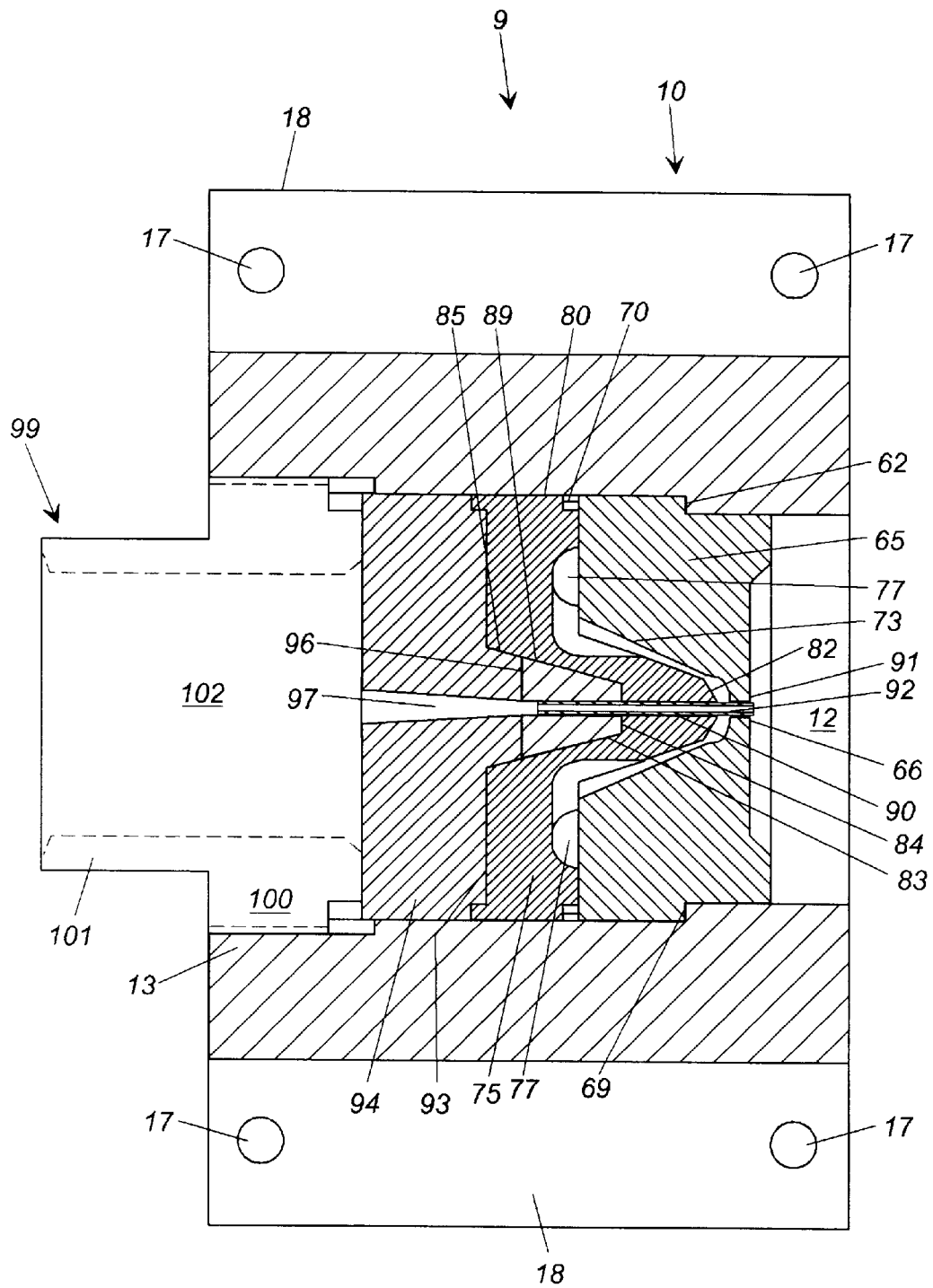
FIG. 8 is a cross-sectional view of the crosshead assembly of FIG. 7, shown in its assembled configuration.

The crosshead assembly 9 of FIG. 7 also includes a core guide 94 which is substantially cylindrical in shape and includes a conical surface 95 protruding at the center of its first end. The conical surface 95 has a flat end surface 96 defining a figure-eight-shaped aperture 97 having a shape conforming to two tubes with a spaced portion at the intersection of the two tubes. The figure-eight-shaped aperture 97 extends along the axial length of the core guide 94 and tapers inward from a second end to the first end of the core guide 94 (as shown in FIG. 8). The core guide 94 also has a recessed portion 98 about its outer periphery at the first end thereof The crosshead assembly 9 of FIG. 7 also includes a crosshead nut 99 having threads 100 defined at its first end, and having hexagonal surfaces 101 defined at its second end. The threads 100 can be threaded onto corresponding threads 13 defined at the second end of the crosshead 10 by rotating the crosshead nut 99 relative to the crosshead 10. The hexagonal surfaces 101 allow a wrench or the like to be fitted thereto for use in screwing the crosshead nut 99 into the mating threads 13 of the crosshead 10. The crosshead nut 99 also defines an aperture 102 extending along the axial length thereof.

The cross head 19, die 65, core tube 75, core tube insert 88, core guide 94 and cross head nut 99, can all be made of metal material such as stainless steel or tool steel.

FIG. 8 is a cross-sectional view of the crosshead assembly 9 in its assembled state. The crosshead assembly 9 is assembled by joining the first end of the core tube 75 with the second end of the die 65 so that the conical portion 78 of the core tube 75 is inserted into and opposes the conical surface 73 of the die 65, and so that the flat surface of the first end of the core tube 75 contacts the flat surface of the second end of the core die 65 to enclose the passages 78 and a side of the notch 76. As so fitted together, the rim 70 of the die 65 engages with the recessed portion 80 of the core tube 75 to hold the die 65 and the core tube 75 together.

The first end of the core tube insert 88 is inserted through the second end of the core tube 75 in the aperture 81, and into the figure-eight-shaped aperture 66 of the die 65. As so inserted, the end of the conical portion 89 abuts the step 84 of the core tube 75, the conical portion 89 of the core tube insert 88 contacts the conical surface 83 inside of the core tube 75, and the surface of the extension 90 contacts the surface 82 of the core tube 75. Also, as so inserted, the tubes 91 extend into the figure-eight-shaped aperture 66 of the die 65 so that the outer surfaces of the tubes 91 oppose respective circular surfaces defining the figure-eight-shaped aperture 66.

The first end of the core guide 94 is joined with the second end of the core tube 75 so that the conical portion 95 is inserted into the aperture 81 of the core tube 75 and meets with the conical surface 83 thereof. The flat surface 96 of the core tube insert 88 thus abuts the second end of the core tube insert 88 to hold the core tube insert 88 inside of the core tube 75 and the die 65. The aperture 97 of the core guide 94 thus communicates with the apertures 92 of the core tube insert 88 at the second end thereof. Also, the recessed portion 98 receives the rim 85 of the core tube 75 to hold the core guide 94 and the core tube 75 together.

The assembled die 65, core tube 75, core tube insert 88 and core guide 94 are then inserted, with die 65 being inserted first, into the cavity 11 defined in the crosshead 10 until the ledge 69 of the die 65 abuts the step 62 of the crosshead 10. The threads 100 of the crosshead nut 99 are then threaded to mating threads 13 of the crosshead 10, to hold the die 65, the core tube 75, the core tube insert 88 and the core guide 94 in position inside of the crosshead 10.

In preparation for making the zip-cord duplex optical fiber cable 1 of this invention, the buffer 5 is extruded on the optical fiber 4, which is preferably coated, using well-known techniques, to make a buffered optical fiber. If the buffer 5 is to be relatively thick (e.g., 900 mm in diameter), a substance such as Modaflo™ is applied to the optical fiber 4 to aid in stripping the buffer 5 when attaching a connector(s) for example, to the zip-cord duplex optical fiber 1. The application of the substance such as Modaflo™ can be applied to the outer surface of the optical fiber 4 by drawing the optical fiber 4 through a container holding such substance. On the other hand, if the buffer 5 is relatively thin (e.g., 500 microns in diameter), the slick substance 6 (such as talc) is applied to the outer surface of the buffer 5 to allow it to slip relative to the yarn layer 7 to avoid breakage of the optical fiber 4 which could occur, for example, if the buffer 5 is unable to slip relative the yarn layer 7 during connection of a connector(s) attached to the duplex optical fiber cable 1, to a connector receptacle(s). The slick substance 6 can be applied by spraying or dusting the optical fiber 6 with the substance 6 as the optical fiber 4 and its buffer 5 are advanced in a linear direction. Alternatively, the optical fiber 4 and the buffer 5 can be advanced through a container containing the slick substance 6 for the application of the substance 6 to the outer surface of the buffer 5.

The optical fiber 4 with the buffer 5 are then advanced through the center of an organizer (not shown) which can have a shape conforming to a ring. The ring has apertures radially arranged about the circumference thereof, which receive respective strands to form the aramid yarn layer 7. The yarn strands can be laid straight (i.e., parallel to the optical fiber 4) by advancing the strands through respective holes in the organizer and guiding the strands into contact with the buffer 5 to form the yarn layer 7. Alternatively, the aramid yarn strands can be helically wrapped about the buffer 5 to form the yarn layer 7. As the optical fiber 4 with its buffer 5 are advanced through the center of the organizer, a motor (not shown) drives the organizer to rotate and thus helically wrap the yarn strands onto the outer surface of the buffer 5, to form the yarn layer 7. The yarn strands can be supplied from respective spools which unwind yarn strands as the optical fiber 4 and its buffer 5 are advanced through the center of the organizer. The above procedure is repeated for a second optical fiber to be used in the pair of optical fibers 4 of the zip-cord duplex optical fiber cable 1.

The above procedures result in two separate optical fibers 4 with respective buffers 5 and yarn layers 7.

The ends of the optical fibers 4 with respective buffers 5 and yarn layers 7 are inserted into the aperture 102 of the crosshead nut 99 and also inserted into respective sides, of the figure-eight-shaped aperture 97. Importantly, as best seen in FIG. 8, the apertures 97 are tapered or funnel-like in shape and as such allow for easy insertion of the ends of the optical fibers 4, buffers 5 and yarn layers 7 therein. Upon further insertion, the ends of the optical fibers 4, buffers 5 and yarn layers 7, are inserted into respective apertures 92 and through the ends of the tubes 91 of the core tube insert 88 and further through the aperture 12 of the crosshead 10. At the left of the crosshead assembly 9 in FIG. 8, the ends of the optical fibers 4, buffers 5 and yarn layers 7, are coupled to a motor (not shown) which draws them through the crosshead assembly 9.

As the optical fibers 4, respective buffers 5 and yarn layers 7, are drawn through the crosshead assembly 9 with the motor, molten plastic material such as nylon or PVC, is forced through the aperture 64 of the crosshead 10 and into the core tube 75 through the notch 76. The flow of molten plastic material is split by passages 77 and uniformly distributed about the outside of the conical portion 78 of the core tube insert 75 via recessed surfaces 79 and the inner surfaces of conical surface 73 of the die 65. The opposing conical surfaces 78, 73 of the core tube 75 and the die 65, respectively, cause the split flows of molten material to converge as they flow toward the tip of the conical portion 78, a feature of this invention which enhances the density, and therefore uniformity, of the extruded sheath 8. The flow of molten plastic material passes over the surfaces of the extension 90 and tubes 91 and are shaped by the surfaces of the die 65 defining the outer surface of the sheath 8. As the sheath 8 cools after extrusion from the crosshead assembly 9 of FIG. 8, the sheath 8 constricts to a degree and contacts the yarn layers 7 to form a zip-cord duplex optical fiber cable 1 as shown in FIG. 6. Preferably, the molten plastic material forming the sheath 8 is PVC extruded at a temperature of 180° C. and cooled by immersion in 40° C.–60° C. water.

Figure 9:
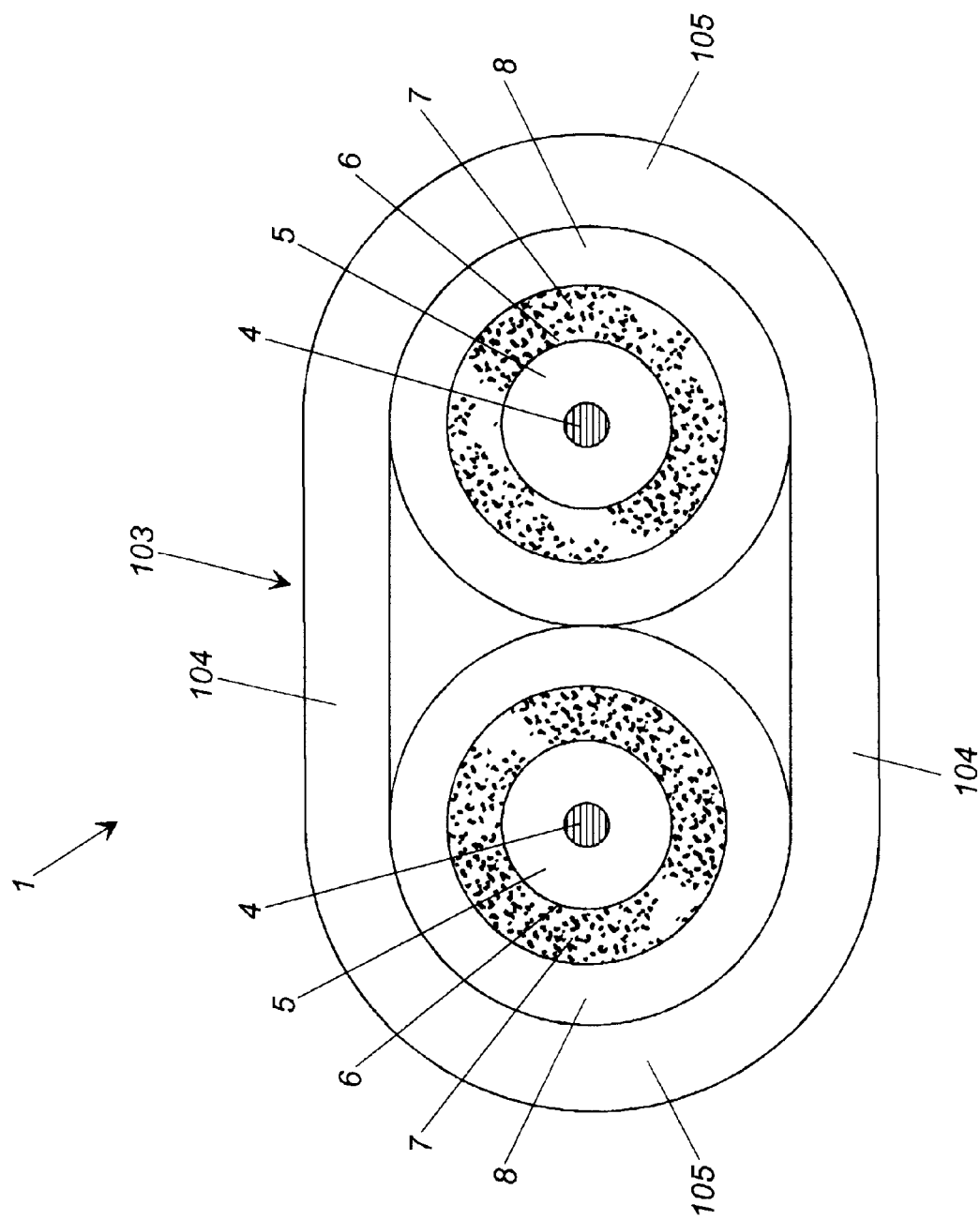
FIG. 9 is a cross-sectional view of a second embodiment of the duplex optical fiber cable in accordance with this invention.

FIG. 9 is a cross-section of a second embodiment of a duplex optical fiber cable 1 of this invention. Essentially, the second embodiment of the duplex optical fiber cable 1 includes two simplex optical fiber cables 1 as shown in FIG. 3 which are positioned side-by-side in a substantially parallel relationship. Extruded to substantially surround and contact the two simplex optical fiber cables 1, an oversheath 103 is formed. The oversheath 103 includes opposing, on the substantially parallel sides 104 with ends joined by respective semi-circular sides 105 which are rounded to conform to respective outer surfaces of the sheath 8 of respective simplex optical fiber cables 1.

To attach connectors to respective ends of the two simplex optical fibers 1 contained in the oversheath 103, the oversheath 103 can be stripped from an end of the duplex optical fiber cable 1 to free the ends of the two simplex optical fiber cables 1. Connectors can then be attached to the ends of each simplex optical fiber cable 1.

Preferably, the duplex optical fiber cable 1 of FIG. 9 is in cross-section about 1.6 mm to 2.1 mm in height and 2.76 mm to 4.2 mm in width, but preferably is in two standard sizes, one being 1.68 mm in height and 2.76 mm in width and the other being 1.6 mm in height and 4.2 mm in width. In the first standard size, the optical fibers 4 are about 0.250 mm in diameter, the buffers 5 are about 0.13 mm in radial thickness, the yarn layers are about 0.22 mm in radial thickness and the sheaths 8 are about 0.18 mm in radial thickness. In the second standard size, the optical fibers 4 are about 0.25 mm in diameter, the buffers 5 are about 0.32 mm in radial thickness, the yarn layers are about 0.22 mm in radial thickness and the sheaths 8 are about 0.18 mm in radial thickness.

The die 9 used to make the second embodiment of the duplex optical fiber cable 1 of this invention is substantially similar to that shown in FIG. 7, except that the die 65 has an aperture 66 conforming in shape to the outer surface of the oversheath 103 shown in FIG. 9 rather than the figure-eight-shaped configuration of FIG. 7, and the apertures 92 of the tubes 91 of the core tube insert 88 are sized to receive respective simplex optical fiber cables.

Advantageously, due to the application of the slick substance 6, the simplex and duplex optical fiber cables 1 of this invention allow the buffer 5 to slip relative to the yarn layer 7 when the ferrule of a connector at the terminal end of the optical fiber cable 1 is connected to a connector receptacle. This feature of this invention prevents fatigue or damage of the optical fiber(s) 4 in the optical fiber cable 1 due to overbending which would otherwise occur with relatively thin buffers 5 (e.g., 500 microns in diameter) in the absence of the slick substance 6. On the other hand, if the buffer 5 is relatively thick (e.g., 900 microns in diameter), a slippery substance such as Modaflo™ is applied to the outside of the optical fiber(s) 4 so that the greater hoop stress of the relatively thick buffer 5 will not impede the stripping of the buffers 5 to attach connectors, for example. In addition, the crosshead assembly 9 used to manufacture the simplex and duplex optical fiber cables 1 of this invention extrude a relatively uniform sheath 8 or oversheath 103 which provides increased protection for the optical fiber(s) 4 relative to the nonuniform extrusions of sheath material of previously used optical fiber cables. This advantage is derived from distributing the molten plastic material in split flows using passages 37, 38 of the core tube 36 of FIG. 4 or passages 77 of the core tube 75 of FIG. 7 to extrude molten plastic material uniformly at various points around the outer surfaces of the yarn(s) 7 of the simplex or duplex optical fiber cables 1 of this invention. In addition, the conical portion 51 and the funnel-like portion 32 (FIG. 4) or the conical portion 78 and the conical surface 73 (FIG. 7) cause the split flows of plastic material to converge, thus increasing the uniformity of the extruded plastic sheath 8 or the oversheath 103. Moreover, the crosshead assemblies 9 of this invention have funnel-shaped apertures 56, 48 (see FIG. 5) or 97, 92 (see FIG. 8) when assembled which allows the ends of the optical fiber(s) 4, the buffer(s) 5 and yarn layer(s) 7, to be threaded relatively easily into the crosshead assembly 9 in preparation for extruding the sheath 8 or the oversheath 103. In addition, the die 29, the core tube 36 and the core tube insert 46 of FIG. 4 and the die 65, core tube 75 and the core tube insert 88 of FIG. 7 are relatively easy to replace if they become fouled with extruded plastic, for example, relative to previous crosshead dies which required the replacement of the entire crosshead die rather than an individual component such as the dies 29, 65, the core tubes 36, 75 or the core tube inserts 46, 88 of this invention. In the first and second embodiments of the duplex optical fiber cable 1 of this invention shown in FIGS. 6 and 9, each optical fiber 4 and its buffer 5 are individually wrapped with the yarn layer 7 as opposed to wrapping yarn about side-by-side buffered optical fibers, as done in a previous optical fiber cable. This feature of the invention eliminates the need for bifurcation kits for connecting the end of a duplex optical fiber cable to a pair of connectors, which require components that greatly increase tie diameter of a duplex optical fiber cable using a bifurcation kit. The increased size of the optical fiber cable using a bifurcation kit greatly increases the complication and congestion in racks or troughs of cabinets, a problem which is overcome by this invention.

Although the invention has been described with specific illustrations and embodiments, it will be clear to those of ordinary skill in the art that various modifications can be made therein without departing from the scope and spirit of the invention as outlined in the following claims. For example, the buffer 5, the sheath 8, and the oversheath 103 can be made of other materials than nylon or PVC as disclosed herein, such as halogen or non-halogen or plenum-rated plastic materials. Also, although the yarn 7 is preferably made of aramid fibers, other types of strength yarns can be used without departing from the scope of this invention. Moreover, the crosshead dies 9 of FIGS. 4 and 7 are shown by way of illustration of the principles of this invention only, and various modifications such as forming one or more parts of the crosshead assembly 9 together or even forming the dies and passageways of the core tubes or core tube inserts differently, can be done without departing from the scope of this invention, the important feature with respect to designing the crosshead assembly 9 being that the molten material is distributed at more than one point leading into the die forming the outside of the sheath 8 or the oversheath 103, and that the flow of molten material converges to increase the uniformity of the sheath 8 or the oversheath 103. All these modifications are intended to be included within the scope of the invention as outlined in the following claims.

We claim:

1. A method for making an optical fiber cable, the method comprising the steps of:
   a) receiving a flow of molten plastic material with a core tube;
   b) splitting the flow of molten plastic material in the core tube;
   c) supplying the flows split in said step (b) to separated locations defined at annularly-spaced intervals in the core tube;
   d) molding the split flows of molten plastic material from the separated locations, between a surface of a die defining an aperture with at least one circular hole less than 2.0 mm in diameter, and an end portion of a core tube insert having an end portion extending into the aperture of the die; and
   e) advancing at least one optical fiber having a respective buffer and yarn layer, through an aperture defined in the core tube insert, the core tube and the die so that the molding of said step (d) forms a sheath about the yarn layer, the buffer and the optical fiber.

2. A method as claimed in claim 1, further comprising the step of:
   f) channeling the split flows supplied in said step (c) between respective opposing conical surfaces of the core tube insert and the die so that the flows converge and increase in density and uniformity, before performing said step (d).

3. A method for making an optical fiber cable as claimed in claim 1, further comprising the step of:
   applying a slick substance to an outer surface of the buffer.

4. A method for making an optical fiber cable as claimed in claim 3, wherein the slick substance includes talc.

5. A method for making an optical fiber cable as claimed in claim 1, further comprising the step of:
   applying a friction-reducing substance to an outer surface of the optical fiber.

6. A method for making an optical fiber cable as claimed in claim 5, wherein the friction-reducing substance comprises PTFE and acetone.

7. A method as claimed in claim 1, wherein the sheath is a first sheath, and further comprising the steps of:
   extruding molten plastic material to form a second sheath with a circular cross-section having an outer surface less than 2.0 mm about a second yarn layer surrounding and in contact with a second buffer of a second optical fiber; and
   extruding molten plastic material to form an oversheath surrounding and in contact with the first and second sheaths, the oversheath having a cross-sectional height less than 2.0 mm and a cross-sectional width less than 4.0 mm.

8. A method as claimed in claim 1, and wherein the sheath is a first sheath, and wherein the extruding of the first sheath in said step (a) is performed about a second yarn layer surrounding and in contact with a second buffer of a second optical fiber, so that the first sheath has two intersecting portions with respective circular outer surfaces less than 2.00 mm in diameter surrounding and in contact with the respective first and second yarn layers, and having a relatively thin portion connecting the two intersecting portions, the sheath having a cross-section conforming to a figure-eight shape, the sheath having a cross-sectional height less than 2.25 mm and a cross-sectional width less than 4.60 mm.

9. A method as claimed in claim 1, wherein the flows of step (c) are defined as first and second primary flows, and wherein each of the primary flows is divided into first and second secondary flows, each of the secondary flows being supplied to one of the separate locations.

10. A method as claimed in claim 7, wherein the oversheath has a cross-section conforming to a figure-eight shape.

11. A method as claimed in claim 9, wherein the separate locations are annularly-spaced at ninety (90) degree intervals about a circumference of the core tube.

* * * * *